(12) United States Patent
Dalsgaard et al.

(10) Patent No.: US 12,477,367 B2
(45) Date of Patent: Nov. 18, 2025

(54) CONTROLLING NETWORK MEASUREMENTS

(71) Applicant: Nokia Technologies Oy, Espoo (FI)

(72) Inventors: Lars Dalsgaard, Oulu (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 473 days.

(21) Appl. No.: 17/917,601

(22) PCT Filed: Apr. 9, 2020

(86) PCT No.: PCT/EP2020/060231
§ 371 (c)(1),
(2) Date: Oct. 7, 2022

(87) PCT Pub. No.: WO2021/204396
PCT Pub. Date: Oct. 14, 2021

(65) Prior Publication Data
US 2023/0180037 A1    Jun. 8, 2023

(51) Int. Cl.
*H04W 24/10* (2009.01)
*H04W 24/08* (2009.01)
*H04W 36/00* (2009.01)
*H04W 76/10* (2018.01)
*H04W 76/30* (2018.01)

(52) U.S. Cl.
CPC .......... *H04W 24/10* (2013.01); *H04W 24/08* (2013.01); *H04W 36/00692* (2023.05); *H04W 76/10* (2018.02); *H04W 76/30* (2018.02)

(58) Field of Classification Search
CPC ............................. H04W 24/10; H04W 76/27
See application file for complete search history.

(56) References Cited

U.S. PATENT DOCUMENTS

| | | | |
|---|---|---|---|
| 2019/0037425 A1* | 1/2019 | Hong | ..................... H04W 72/23 |
| 2019/0037435 A1 | 1/2019 | Hong et al. | |
| 2019/0173634 A1 | 6/2019 | Teyeb et al. | |
| 2019/0342801 A1* | 11/2019 | Cui | ....................... H04W 72/23 |

* cited by examiner

*Primary Examiner* — Pamit Kaur
(74) *Attorney, Agent, or Firm* — Barta Jones, PLLC

(57) ABSTRACT

Apparatuses and methods for controlling measurements are disclosed. A message is received from a network element, the message including instructions to perform measurements of given carriers during given measurement gap pattern during next connection setup with the network. Connection setup is started with the network and the measurements of given carriers are performed during the given measurement gap pattern and measurement result reported to the network.

11 Claims, 5 Drawing Sheets

CONTROLLING NETWORK MEASUREMENTS

CROSS REFERENCE TO RELATED APPLICATION

This patent application is a U.S. National Stage application of International Patent Application Number PCT/EP2020/060231 filed Apr. 9, 2020, which is hereby incorporated by reference in its entirety.

FIELD OF THE INVENTION

The exemplary and non-limiting embodiments of the invention relate generally to wireless communication systems. The exemplary and non-limiting embodiments of the invention relate especially to apparatuses and methods in wireless communication networks.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

One possibility to increase reliability and capacity is to utilise Carrier Aggregation (CA) and Dual Connectivity (DC). In dual connectivity, the user equipment may simultaneously transmit and receive data on multiple component carriers from different access point or base stations, denoted master eNodeB (MN) and secondary eNodeB (SN) in case of two access points. In multi connectivity there may be more than two access nodes involved. In carrier aggregation, user equipment is configured to simultaneously transmit and receive data on multiple component carriers. Carrier aggregation and dual connectivity may also be applied at the same time. For example, in the development of long term evolution advanced, LTE Advanced and new radio, NR or 5G, it has been proposed to apply enhanced Multi Radio access technology (Multi-RAT) Dual Connectivity, MR-DC/CA, or DCCA, where user equipment may apply CA and DC to an LTE-A access point and an NR access point.

SUMMARY

The following presents a simplified summary of the invention in order to provide a basic understanding of some aspects of the invention. This summary is not an extensive overview of the invention. It is not intended to identify key elements of the invention or to delineate the scope of the invention. Its sole purpose is to present some concepts of the invention in a simplified form as a prelude to a more detailed description that is presented later.

According to an aspect of the present invention, there is provided an apparatus in a radio access network, comprising: at least one processor; and at least one memory including computer program code, the at least one memory and the computer program code configured to, with the at least one processor, cause the apparatus at least to perform: receive a message from a network element, the message comprising instructions to perform measurements of given carriers during given measurement gap pattern during next connection setup with the network; start connection setup with the network; perform the measurements of given carriers during the given measurement gap pattern; report measurement result to the network.

According to an aspect of the present invention, there is provided an apparatus in a radio access network, comprising: at least one processor; and at least one memory including computer program code, the at least one memory and the computer program code configured to, with the at least one processor, cause the apparatus at least to perform: control transmission of a message to user equipment, the message comprising instructions for the user equipment to perform measurements of given carriers during given measurement gap pattern during the next connection setup of the user equipment with the network.

According to an aspect of the present invention, there is provided a method in an apparatus in a radio access network, comprising: receiving a message from a network element, the message comprising instructions to perform measurements of given carriers during given measurement gap pattern during next connection setup with the network; starting connection setup with the network; performing the measurements of given carriers during the given measurement gap pattern; reporting measurement result to the network.

According to an aspect of the present invention, there is provided a method in apparatus in a radio access network, comprising: controlling transmission of a message to user equipment, the message comprising instructions for the user equipment to perform measurements of given carriers during given measurement gap pattern during the next connection setup of the user equipment with the network.

According to an aspect of the present invention, there is provided a computer program comprising instructions for causing an apparatus to perform at least the following: receiving a message from a network element, the message comprising instructions to perform measurements of given carriers during given measurement gap pattern during next connection setup with a network; starting connection setup with the network; performing the measurements of given carriers during the given measurement gap pattern; reporting measurement result to the network.

According to an aspect of the present invention, there is provided a computer program comprising instructions for causing an apparatus to perform at least the following: controlling transmission of a message to user equipment, the message comprising instructions for the user equipment to perform measurements of given carriers during given measurement gap pattern during the next connection setup of the user equipment with a network.

One or more examples of implementations are set forth in more detail in the accompanying drawings and the description below. Other features will be apparent from the description and drawings, and from the claims. The embodiments and or examples and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the attached drawings, in which.

DETAILED DESCRIPTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to user equipment, user terminal, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly, and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
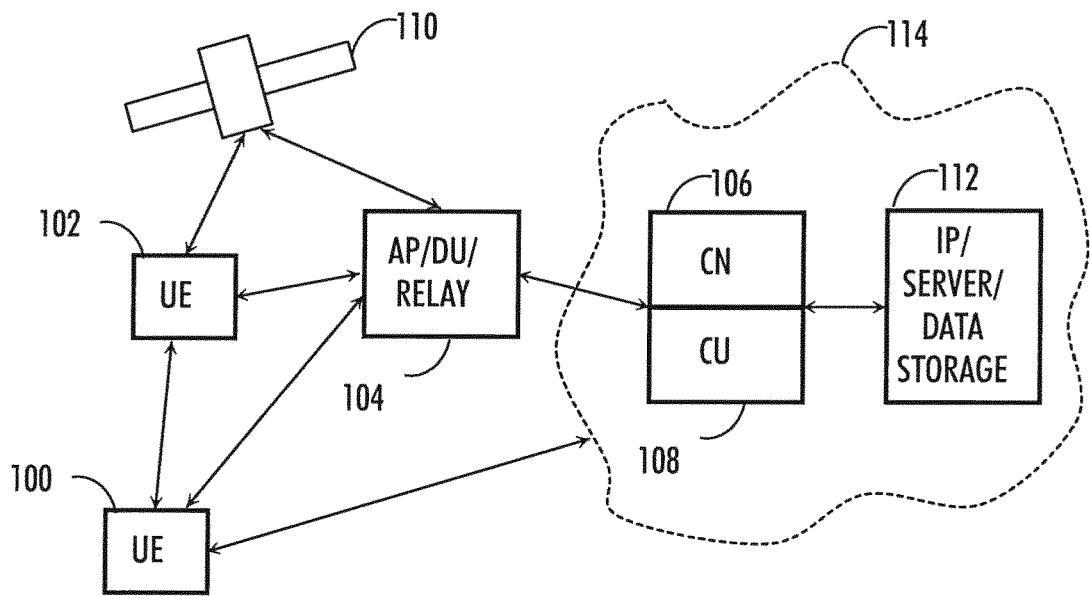
FIGS. 1 and 2 illustrate examples of simplified system architecture of a communication system.

FIG. 1 depicts examples of simplified system architectures showing some elements and functional entities, all or some being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels to a node 104. The node 104 is further connected to a core network 106. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), or an Access and Mobility management Function, AMF, A Session Management Function, SMF for managing data connectivity of devices (user terminals), an User Plane Function, UPF, for providing connectivity of devices (user terminals) to data networks, etc.

The device (also called user device, a subscriber unit, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyberphysical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). At least one satellite 110 in the megaconstellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

Figure 2:
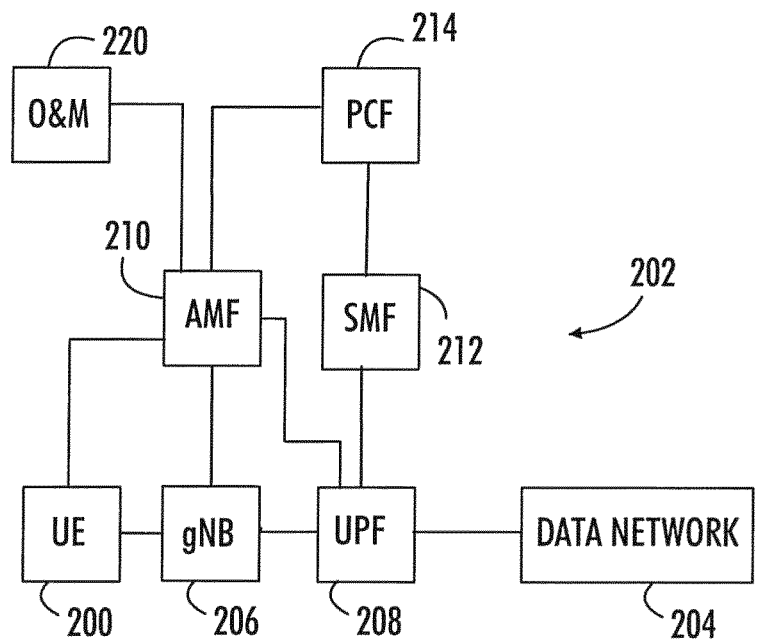

FIG. 2 illustrates an example of a communication system based on 5G network components. A user terminal or user equipment 200 communicating via a 5G network 202 with a data network 204. The user equipment 200 is connected to a base station or gNB 206 which provides the user equipment a connection to data network 204 via one or more User Plane Functions 208. The user equipment 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release and a Policy Control Function 214 which is configured to govern network behavior by providing policy rules to control plane functions. The network further comprises operations and maintenance unit (O&M) 220 of the operator of the network.

It may be further noted that for 5G or NR, there has currently been defined two separated frequency ranges for use. The first frequency range, denoted as Frequency Range 1 (FR1), comprises frequency bands below 6 GHz. The other frequency range, denoted as is Frequency Range 2 (FR2), comprises frequency bands from 24.25 GHz to 52.6 GHz.

To enable user equipment to perform measurements, the concept of measurement gap has been introduced. A measurement gap may be defined as a time window during which the user equipment is allowed to switch from the serving carrier to the carrier to be measured. During the gap window the user equipment is not required to receive or transmit on the serving cell/carrier. NR has defined multiple measurement gap patterns. A gap pattern comprises a specific combination of measurement gap length and gap periodicity. For example, following gap patterns are defined:

| Gap Pattern Id | Gap Length (ms) | Gap Repetition Period |
|---|---|---|
| 0 | 6 | 40 |
| 1 | 6 | 80 |
| 2 | 3 | 40 |
| 3 | 3 | 80 |

Enhanced utilisation of Carrier Aggregation, (euCA), in LTE and NR enhanced Multi-RAT Dual Connectivity, (MR-DC/CA), (DCCA) have been under study. In general, motivation for using CA and/or DC (or multi-connectivity approaches in general) are that they may provide better system capacity and higher data rates. Basically, in carrier aggregation UE may transmit and receive data simultaneously on multiple component carriers. Each aggregated carrier may be referred to as a component carrier (CC). In dual connectivity the UE may have data connections with two access points. In dual connectivity, one of the access points is Master eNB (MeNB) comprising of the PCell and optionally one or more SCells and the other access point is Secondary eNB (SeNB) comprising of PCell and optionally one or more SCells.

When user equipment initiates connection setup after being in idle mode, fast cell configuration and activation in connection with CA/DC is desired. In euCA, so called early measurements have been proposed, where the user equipment may perform carrier measurements while being in idle mode. The network may inform the user equipment what carriers to measure. When the user equipment is back in connected state, it may report the measurements to the network. This method is denoted as Early Measurement Reporting (EMR).

However, there may be some problems in performing the measurements. For example, delays may be rather large. Related to measurements, there are two types of carriers defined: overlapping carriers and non-overlapping carriers. An overlapping carrier is defined as a carrier configured by higher layer for early measurement reporting and inter-frequency mobility measurements. A nonoverlapping carrier is defined as a carrier configured by higher layer for early measurement reporting but not for inter-frequency mobility measurements. Thus, an overlapping carrier is a carrier used for EMR and mobility and a non-overlapping carrier is a carrier used only for EMR.

When discussing EMR measurement what is important is the actual measurement requirements and accuracy for the NR EMR carriers. The overall UE measurement effort and latency are very important aspects and especially how this can be improved by use of EMR.

Especially in NR (5G) systems, performing measurements is more difficult compared to earlier systems. For example, in LTE, cells have an omni-directional transmission, cell-specific reference signals (CRS) is sent all the time and UE is omni-directional as well.

However, in NR situation is quite different. In NR, the UEs are configured to decode Primary Synchronization Signal (PSS) and Secondary Synchronization Signal (SSS) transmitted by a cell to decode time slot information and physical cell id. In NR, PSS, SSS (and Physical Broadcast Channel (PBCH)) are transmitted in a Synchronization Signal Block (SSB). However, the PSS/SSS/PBCH=SSB information may not be sent continuously but may have different periodicities. The periodicities are indicated in SSB measurement timing configuration (SMTC), which tells when the UE could expect to measure and find an SSB. The SMTC with a certain duration and periodicity is used to restrict the UE measurement on the certain resources to reduce the UE power consumptions. Within SMTC period and on the configured SSB, UE will conduct the RRM measurements.

In NR frequency range FR2, measurements performed by user equipment during connection setup have been limited in current standards. The user equipment is allowed a measurement relaxation during given steps of connection setup. Due to this, the measurements can take a long time the user equipment may not be able to complete EMR measurements before the connection setup.

On the other hand, the user equipment may not be able to measure all carriers once the connection setup is initiated (depending on user equipment capabilities). In such case, the user equipment would not be able to deliver any EMR to the network.

In an embodiment, to enable the user equipment to provide better and up to date measurements, the network may transmit the user equipment a message to utilise a predefined measurement gap pattern which is to be used by user equipment during connection setup.

In an embodiment, for enabling the user equipment to provide better and up to date inter-frequency/RAT measurements to facilitate early CA/DC setup during the connection setup, a preconfigured measurement gap pattern is defined. the gap pattern to be used by user equipment during the connection setup.

Figure 3:
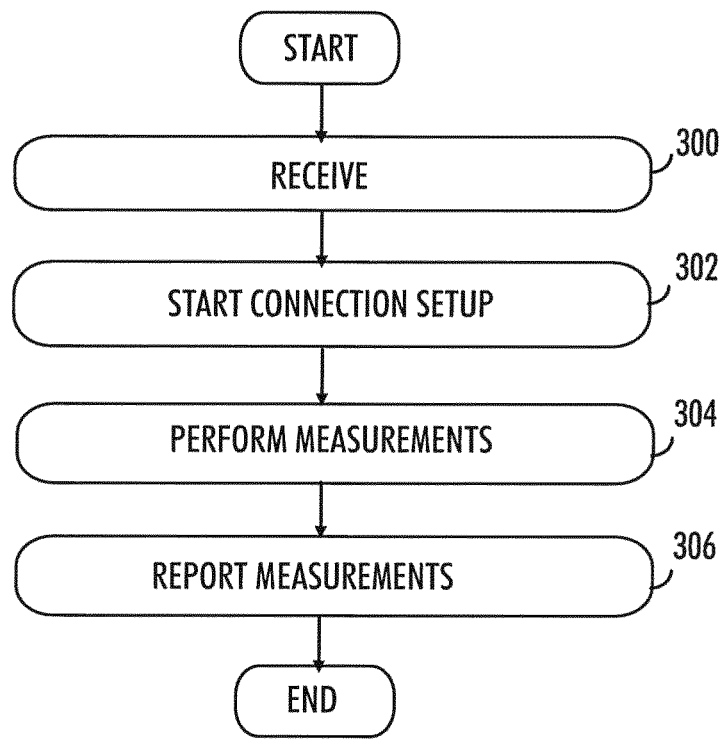
FIGS. 3 and 4 are flowcharts illustrating some embodiments.

FIG. 3 is a flowchart illustrating an embodiment. The flowchart illustrates an example of the operation of the apparatus or network element acting as a user equipment or a part of a user equipment.

In step 300, the apparatus is configured to receive a message from a network element, the message comprising instructions to perform measurements of given carriers during a given measurement gap during next connection setup with the network.

In an embodiment, the measurement gap pattern may be configured by network as part of the EMR configuration. For example, the apparatus may be configured to receive the message while being in connected state with the network. In an embodiment, the apparatus is configured to receive the message during connection release.

In an embodiment, the measurement gap pattern may be configured by the network as part of the EMR configuration, for example at connection release and stored by the user equipment.

In an embodiment, the message comprises information on which carriers the user equipment is to measure.

In an embodiment, the user equipment may have stored definitions of measurement gap patterns available at the network. The message received from the network may indicates to the user equipment which predefined measurement gap pattern to use.

After connection release, the apparatus is in idle state.

In step 302, the apparatus is configured to start connection setup with the network.

In step 304, the apparatus is configured to perform the measurements of given carriers during the given measurement gap.

In step 306, the apparatus is configured to report measurement result to the network.

In an embodiment, for an EMR capable user equipment, if the connection setup is initiated while T331 is running, the user equipment will apply the gap pattern and perform the configured measurements during the connection setup phase (using the measurement gaps).

In an embodiment, when the apparatus moves to the idle state, it is configured to initiate a timer which has a given duration. In an embodiment, the timer may be T331 timer. If the connection setup occurs while the timer is running, the apparatus performs the measurements during the connection set up. In an embodiment, if the connection setup occurs while the timer has lapsed, the apparatus is not required to perform the measurements during the connection set up.

In an embodiment, the network may assume that the user equipment applies the gap pattern and can account this during the connection setup. For example, the network may consider this during the scheduling.

It may be noted here that the proposed solution is not limited to early measurement reporting but can be applied also in other situations where measurements of the user equipment are needed. For example, in an example embodiment, for an non-EMR capable user equipment at connection setup initiation, the user equipment will apply the gap pattern and perform the configured measurements during the connection setup phase (using the measurement gaps).

In an embodiment, once in connected state the user equipment may apply any configured measurement gap pattern as defined.

In an embodiment, the user equipment is configured with a measurement gap pattern during connected mode or connection release message, which the user equipment stores during idle mode. The configured gap pattern may be applied by the user equipment when the user equipment is configured with EMR and a connection setup measurement gap pattern and the EMR timer T331 is running (assuming EMR is to be carried out in the cell in which the connection is setup).

Figure 4:
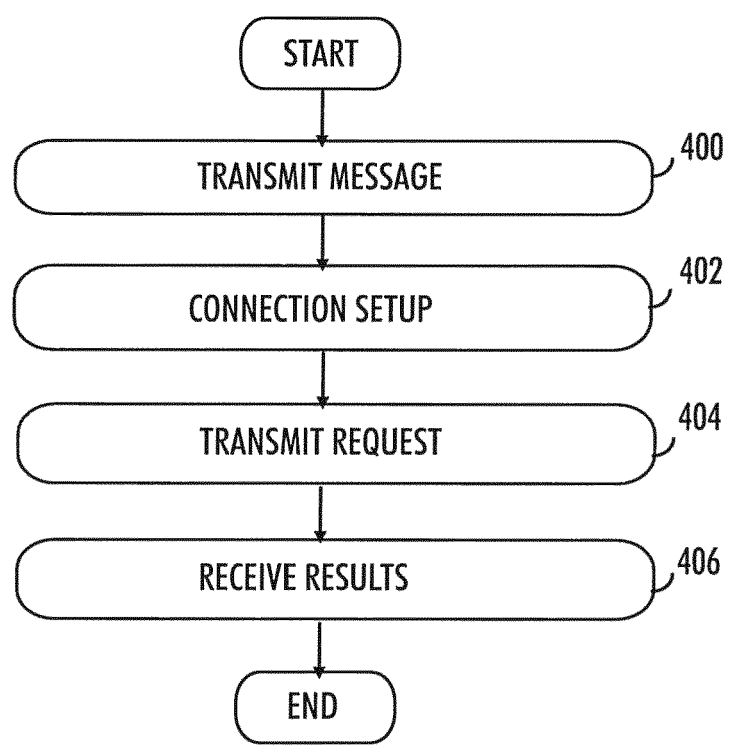

FIG. 4 is a flowchart illustrating an embodiment. The flowchart illustrates an example of the operation of the apparatus or network element. In an embodiment, the network element acts as an access point or (e/g)NB or a part of a an access point or (e/g)NB.

In step 400, the apparatus is configured to control transmission of a message to user equipment, the message comprising instructions for the user equipment to perform measurements of given carriers during given measurement gap during the next connection setup of the user equipment with the network.

In an embodiment, the apparatus controls transmission of the message while the user equipment is in connected state with the network.

In an embodiment, the apparatus controls transmission of the message during connection release of the user equipment.

In step 402, the apparatus is configured to take the measurement gap of the user equipment into account when the user equipment performs connection setup by adjusting scheduling regarding the user equipment.

In step 404, the apparatus is configured to control transmission of a request to the user equipment for results of the measurement made during the given measurement gap.

In step 406, the apparatus is configured to control reception of the measurement results.

Thus, in an embodiment, a network element configures the user equipment with a measurement gap pattern during connected mode or connection release message, which the user equipment is configured to store during idle mode. The user equipment may be configured to apply or utilize the measurement gap pattern when the user equipment performs connection setup.

An example implementation in Abstract Syntax Notation One (ASN.1) of signalling to facilitate the stored measurement gap pattern could be (new signalling parts in bold) as follows. The RRCRelease message with a MeasIdleConfig information element may be of the form:

```
-- ASN1START
-- TAG-RRCRELEASE-START
RRCRelease ::=                          SEQUENCE {
    rrc-TransactionIdentifier               RRC-TransactionIdentifier,
    criticalExtensions                      CHOICE {
        rrcRelease                              RRCRe-
lease-IEs,
        criticalExtensionsFuture                SEQUENCE { }
    }
}
...
RRCRelease-v16xx-IEs ::=                SEQUENCE {
    measIdleConfig-r16                                  SetupRelease
{MeasIdleConfigDedicated-r16}           OPTIONAL, -- Need M
                                        nonCriticalExtension        SEQUENCE { }
OPTIONAL
}
```

In the message, the MeasIdleConfig information element may be as follows:

```
MeasIdleConfigSIB-r16 :: = SEQUENCE {
        measIdleCarrierListNR-r16           SEQUENCE (SIZE (1..maxFreqIdle-
r16)) OF MeasIdleCarr erNR-r16          OPTIONAL,   -- Need S
    measIdleCarrierListEUTRA-r16        SEQUENCE (SIZE (1..maxFreqIdle-r16)) OF
MeasIdleCarrierEUTRA-r16                OPTIONAL,   -- Need S
    ...
}
MeasIdleConfigDedicated-r16 ::= SEQUENCE {
    measIdleCarrierListNR-r16           SEQUENCE (SIZE (1..maxFreqIdle-r16)) OF
MeasIdleCarrierNR-r16                   OPTIONAL,   -- Need N
    measIdleCarrierListEUTRA-r16        SEQUENCE (SIZE (1..maxFreqIdle-r16)) OF
MeasIdleCarrierEUTRA-r16                OPTIONAL,   -- Need N
    measIdleDuration-r16                ENUMERATED{ffs},
    validityAreaList-r16                        ValidityAreaList-r16
OPTIONAL,   -- Need N
measGapConfig                               MeasGapConfig
OPTIONAL,   -- Need N
    ...
}
...
```

The information element MeasGapConfig element may, for example, be as follows:

```
MeasGapConfig ::= SEQUENCE {
gapFR2 SetupRelease { GapConfig } OPTIONAL, -- Need M
...,
[[
gapFR1 SetupRelease { GapConfig } OPTIONAL, -- Need M
gapUE SetupRelease { GapConfig } OPTIONAL -- Need M
]] }
```

The information element GapConfig element may in turn, for example, be as follows:

```
GapConfig ::= SEQUENCE {
gapOffset INTEGER (0..159),
mgl ENUMERATED {ms1dot5, ms3, ms3dot5, ms4, ms5dot5, ms6},
mgrp ENUMERATED {ms20, ms40, ms80, ms160},
mgta ENUMERATED {ms0, ms0dot25, ms0dot5},
...,
[[
refServCellIndicator ENUMERATED {pCell, pSCell, mcg-FR2}
OPTIONAL -- Cond NEDCorNRDC
]]
}
```

Above, the mgl is the gap length (e.g. 6 ms), mgrp is the gap repetition period (e.g. 40 ms). mgta is a possible timing offset (not significant in this context).

In an embodiment, the measurement gap pattern signalling may be realised with a bit indicating that the user equipment shall apply a predefined mandatory gap pattern (GP), such as GP #0, for example, with certain standard parameters to determine the timing and location of the GP. In another embodiment, the GP location may be related to the SMTC of the carrier(s) to be measured.

The access point communicating with the user equipment is aware of the properties and capabilities of the user equipment. Thus, depending on the available carriers and the user equipment capabilities, it may not be necessary to configure the user equipment to utilise a preconfigured measurement gap pattern if the user equipment is capable of performing measurements without the gap pattern.

Depending on the user equipment capability to support FR measurements and network preference, there are two types of measurement gaps defined in NR: per-UE and per-FR.

For example, an access point may have the knowledge regarding the user equipment capabilities of handling the Per-UE or Per-FR gaps. For example, a Per-FR GP capable UE would not need a preconfigured measurement gap pattern if EMR carrier is FR2 carrier and PCell is in FR1. A Per-UE GP capable user equipment would need a preconfigured measurement gap pattern and apply the pattern during the connection setup.

A user equipment not in need for measurement gap patterns for performing the necessary measurements would not apply the GP but perform the measurement and reporting anyway.

Figure 5:
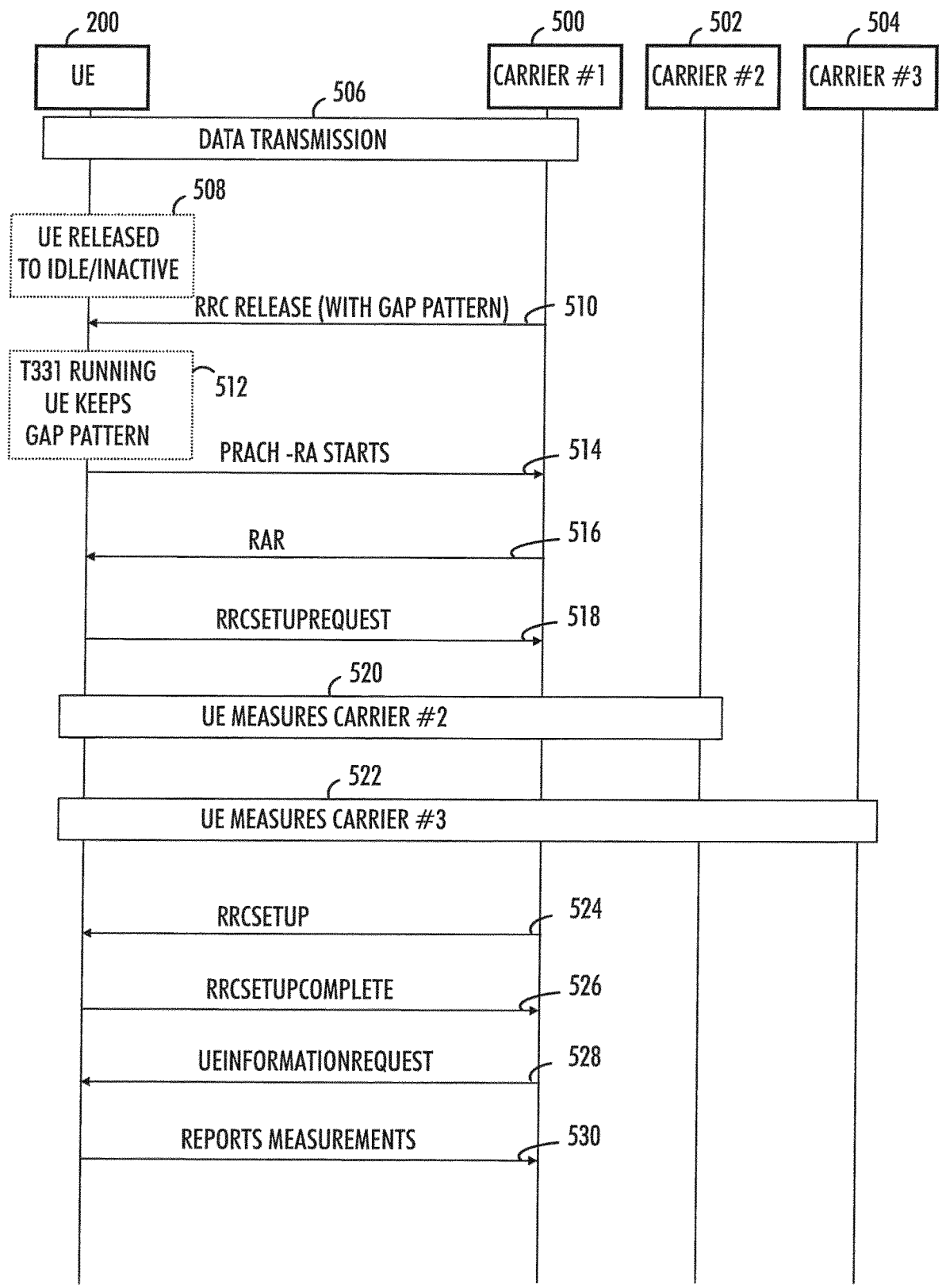
FIGS. 5 and 6 are signalling charts illustrating some embodiments.

FIG. 5 illustrates an example with a signalling chart for an EMR-capable user equipment. The user equipment 200 is having data transmission 506 with an access point on carrier #1 500. Thus, it is in connected state. Next, the data connection terminates, and the user equipment is going to be released 508 to idle mode. Access point transmits to the user equipment on carrier #1 Radio Resource Control (RRC) release command 510. In this example, the RRC Release comprises information on preconfigured measurement gap pattern the user equipment is to use for measurements on next connection setup.

A timer T133 starts running 512 when user equipment enters idle mode. The user equipment keeps the measurement gap pattern while the timer is running While the timer is running, the user equipment is to make a connection setup. While the timer is still running, the user equipment initiates random access procedure 514 on Physical Random Access Channel (PRACH). The access node responds with Random Access Response (RAR) 516. The user equipment transmits RRC setup request message 518.

However, after this message the user equipment is configured to perform measurements according to the configured measurement gap pattern. In this example, the user equipment following the measurement gap pattern, first measures 520 carrier #2. Next, the user equipment measures 522 carrier #3.

Then the connection setup procedure continues with RRC setup message 524 from the access point to the user equipment, which responds with RRC setup complete message 526.

At some point of time, the access point requests 528 from the user equipment information on the measurements. The user equipment is configured to transmit 530 the result to the access point.

FIG. 5 is an example for Release/Setup case. Similar procedure could be envisioned also for the case of Suspend/Resume when the user equipment is in inactive state.

Figure 6:
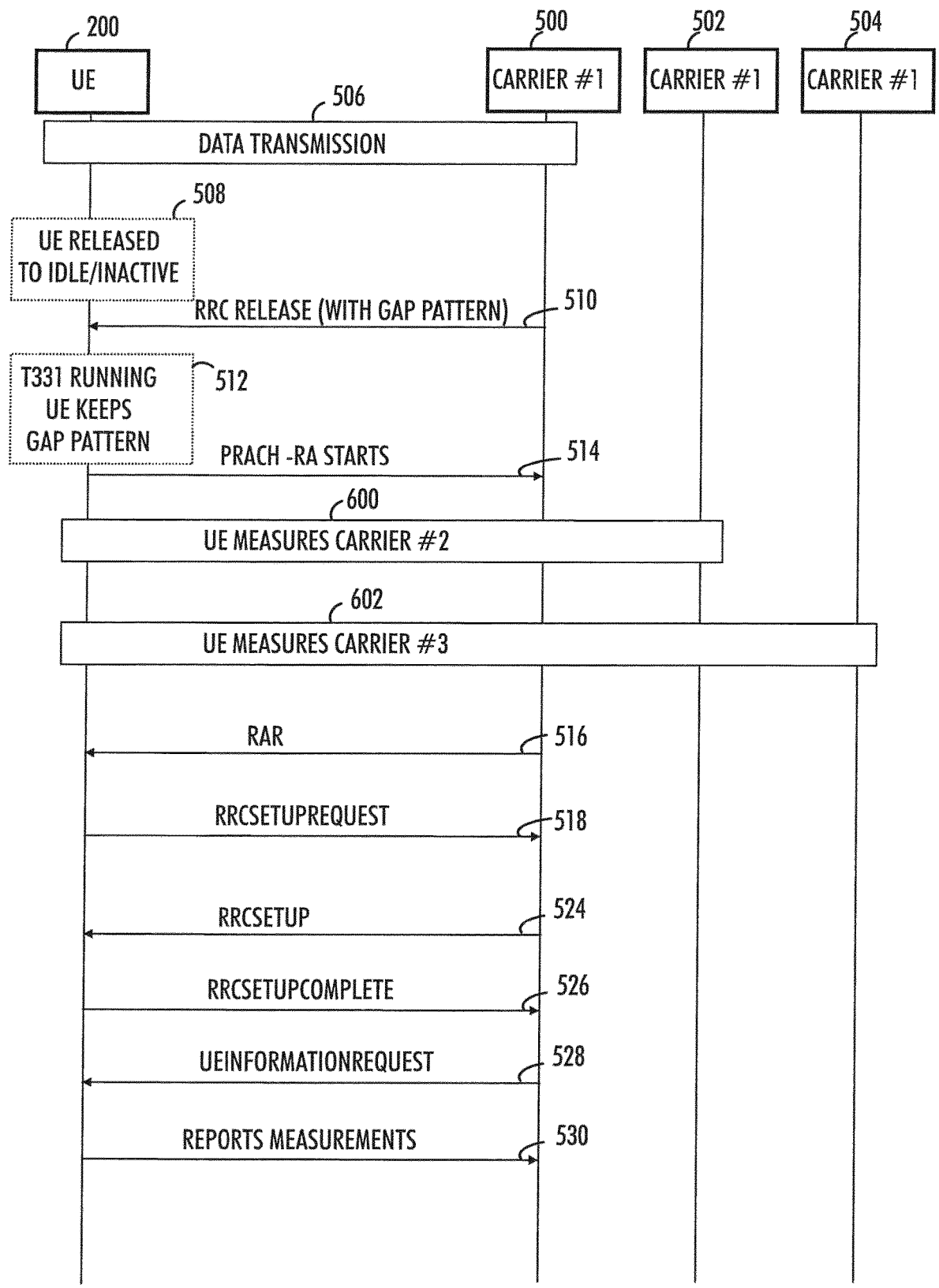

FIG. 6 illustrates another example with a signalling chart. This example is otherwise similar to the example of FIG. 5 as the reference numbers indicate, the same connection setup messages being transmitted between the user equipment and the access point. However, in this example the user equipment is configured by the preconfigured measurement gap pattern to perform the measurement at different point of time. In this example, the user equipment measures 600, 602 carrier #2 and carrier #2 after the initiation of random access procedure 514 on Physical Random Access Channel (PRACH), but before the RAR 516 from the access point. The access point is aware of the measurement gap pattern used by the user terminal and is configured not to transmit the RAR message while the user equipment is performing measurements.

Figure 7:
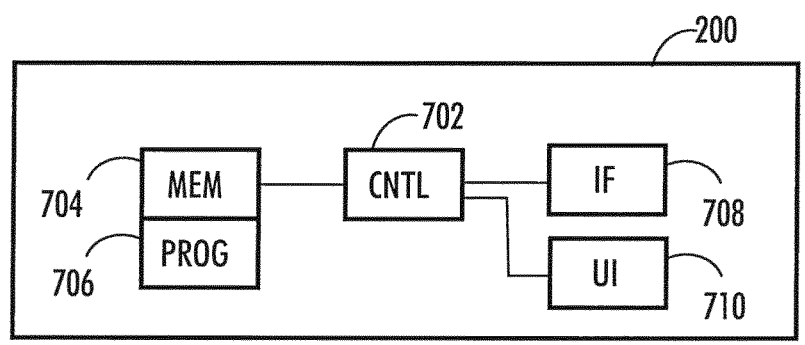
FIGS. 7 and 8 illustrate examples of apparatuses of some embodiments.

FIG. 7 illustrates an embodiment. The figure illustrates a simplified example of an apparatus or network entity applying embodiments of the invention. In some embodiments, the apparatus may be user equipment 200 or a part of user equipment.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 200 of the example includes a control circuitry 702 configured to control at least part of the operation of the apparatus.

The apparatus may comprise a memory 704 for storing data. Furthermore, the memory may store software 706 executable by the control circuitry 702. The memory may be integrated in the control circuitry.

The apparatus further comprises one or more interface circuitries 708 configured to connect the apparatus to other devices and network elements or entities of the radio access network, such as access nodes or eNBs.

The apparatus may further comprise user interface 710. The user interface may comprise a display, which may be touch-sensitive, a microphone, a speaker, a keyboard, for example.

In an embodiment, the software 706 may comprise a computer program comprising program code means adapted to cause the control circuitry 702 of the apparatus to realise at least some of the embodiments described above.

Figure 8:
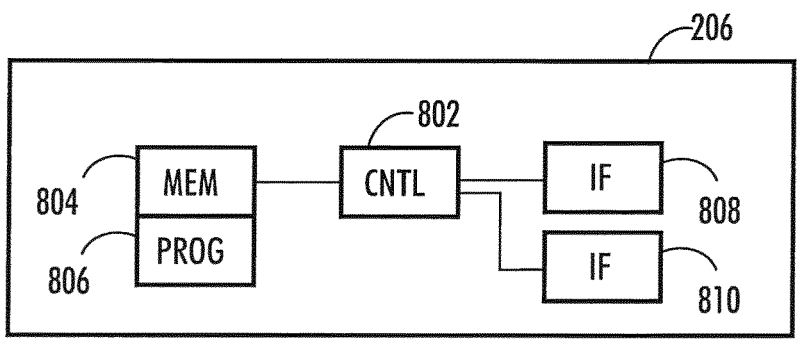

FIG. 8 illustrates an embodiment. The figure illustrates a simplified example of an apparatus or network entity applying embodiments of the invention. In some embodiments, the apparatus may be a network element or network entity acting as an access node or eNB 206, or a part of an access node or eNB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 206 of the example includes a control circuitry 802 configured to control at least part of the operation of the apparatus.

The apparatus may comprise a memory 804 for storing data. Furthermore, the memory may store software 806 executable by the control circuitry 802. The memory may be integrated in the control circuitry.

The apparatus further comprises one or more interface circuitries 808, 810, configured to connect the apparatus to other devices and network elements or entities of the radio access network, such as core network and user terminals. The interfaces may provide wired or wireless connections.

In an embodiment, the software 806 may comprise a computer program comprising program code means adapted to cause the control circuitry 802 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for receiving a message from a network element, the message comprising instructions to perform measurements of given carriers during given measurement gap pattern during next connection setup with the network, means for starting connection setup with the network, means for performing the measurements of given carriers during the given measurement gap pattern, and means for reporting measurement result to the network.

In an embodiment, an apparatus comprises means for controlling transmission of a message to user equipment, the message comprising instructions for the user equipment to perform measurements of given carriers during given measurement gap pattern during the next connection setup of the user equipment with the network.

In an embodiment, a non-transitory computer readable medium comprises program instructions for causing an apparatus to perform at least the following: receiving a message from a network element, the message comprising instructions to perform measurements of given carriers during given measurement gap pattern during next connection setup with the network, starting connection setup with the network, performing the measurements of given carriers during the given measurement gap pattern, reporting measurement result to the network.

In an embodiment, a non-transitory computer readable medium comprises program instructions for causing an apparatus to perform at least the following: controlling transmission of a message to user equipment, the message comprising instructions for the user equipment to perform measurements of given carriers during given measurement gap pattern during the next connection setup of the user equipment with the network.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a radio access network, comprising:
   at least one processor; and
   at least one non-transitory memory storing instructions that, when executed with the at least one processor, cause the apparatus at least to:
   receive, during connection release, a message from a network element, wherein
   the message is a radio resource control release command comprising instructions to perform measurements of given carriers during given based on a defined measurement gap pattern during next connection setup in the radio access network,
   the measurement gap pattern is a time window during which the apparatus is not required to receive or transmit on a serving carrier and switches from the serving carrier to the given carriers for the measurements, the measurement gap pattern being configured by the network element as part of early measurement reporting (EMR) configuration at the connection release, and
   the measurement gap pattern includes a measurement gap length and a gap periodicity, the measurement gap length indicates duration for the measurements on the given carrier, and the gap periodicity includes a repetition period at which the measurements occur;
   start connection setup with the radio access network while a timer of the EMR is running;
   perform the measurements of the given carriers during the given measurement gap pattern during a connection setup phase, when the user equipment is configured with EMR and a connection set up measurement gap pattern; and
   report measurement result to the network element.

2. The apparatus of claim 1, where the at least one memory and the instructions are configured to, with the at least one processor, cause the apparatus further to:
report the measurement result to the network element after the network element sent a request regarding the measurements.

3. The apparatus of claim 2, where the at least one memory and the instructions are configured to, with the at least one processor, cause the apparatus further to:
receive the message while being in connected state with the network element.

4. The apparatus of claim 3, where the at least one memory and the instructions are configured to, with the at least one processor, cause the apparatus further to:
move to an idle state after receiving the message from the network element;
initiate a timer which has a given duration;
perform the measurements during the next connection set up based on the connection setup being initiated while the timer is running.

5. The apparatus of claim 4, wherein the measurements relate to carrier aggregation and dual connectivity applied to the apparatus after the next connection setup.

6. The apparatus of claim 4, wherein a location of the measurement gap pattern in a connection setup signalling is based on a synchronization signal block measurement timing configuration.

7. An apparatus in a radio access network, comprising:
at least one processor; and
at least one non-transitory memory storing instructions that, when executed with the at least one processor, cause the apparatus at least to:
control transmission of a message, during connection release of the user equipment, to a user equipment, the message is a radio resource control release command comprising instructions for the user equipment to perform measurements of given carriers based on a defined measurement gap pattern during next connection setup of the user equipment in the radio access network;
wherein the measurement gap pattern is a time window during which the apparatus is not required to receive or transmit on a serving carrier and switches from the serving carrier to the given carriers for the measurements, and
wherein the measurement gap pattern includes a measurement gap length and a gap periodicity, the measurement gap length indicates duration for the measurements on the given carrier, and the gap periodicity includes a repetition period at which the measurements occur.

8. The apparatus of claim 7, where the at least one memory and the instructions are configured to, with the at least one processor, cause the apparatus further to:
control transmission of the message while the user equipment is in connected state with the network element.

9. The apparatus of claim 7, where the at least one memory and the instructions are configured to, with the at least one processor, cause the apparatus further to:
take the measurement gap pattern of the user equipment into account when the user equipment performs connection setup with adjusting scheduling regarding the user equipment.

10. The apparatus of claim 7, where the at least one memory and the instructions are configured to, with the at least one processor, cause the apparatus further to:
control transmission of a request to the user equipment for results of the measurements made during the given measurement gap pattern; and
control reception of the results.

11. A non-transitory computer readable medium comprising program instructions that, when executed with an apparatus, cause the apparatus to perform at least the following:
receiving, during connection release, a message from a network element, wherein
the message is a radio resource control release command comprising instructions to perform measurements of given carriers based on a defined measurement gap pattern during next connection setup a radio a radio access network,
the measurement gap pattern is a time window during which the apparatus is not required to receive or transmit on a serving carrier and switches from the serving carrier to the given carriers for the measurements, and
the measurement gap pattern includes a measurement gap length and a gap periodicity, the measurement gap length indicates duration for the measurements on the given carrier, and the gap periodicity includes a repetition period at which the measurements occur;
starting connection setup with the radio access network;
performing the measurements of the given carriers during the given-measurement gap pattern; and
reporting measurement result to the network element.

* * * * *